United States Patent
Kim (10) Patent No.: US 10,212,476 B2
(45) Date of Patent: Feb. 19, 2019

(54) IMAGE DISPLAY APPARATUS AND IMAGE DISPLAYING METHOD

(71) Applicant: SAMSUNG ELECTRONICS CO., LTD., Suwon-si (KR)

(72) Inventor: Young-Jin Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/481,639

(22) Filed: Apr. 7, 2017

(65) Prior Publication Data
US 2017/0302992 A1 Oct. 19, 2017

(30) Foreign Application Priority Data
Apr. 15, 2016 (KR) .................. 10-2016-0046502

(51) Int. Cl.
| | |
|---|---|
| H04N 7/173 | (2011.01) |
| H04N 21/438 | (2011.01) |
| H04N 5/445 | (2011.01) |
| H04N 21/235 | (2011.01) |
| H04N 21/2362 | (2011.01) |

(Continued)

(52) U.S. Cl.
CPC ......... *H04N 21/4384* (2013.01); *H04N 5/445* (2013.01); *H04N 5/50* (2013.01); *H04N 21/235* (2013.01); *H04N 21/2362* (2013.01); *H04N 21/435* (2013.01); *H04N 21/4343* (2013.01); *H04N 21/4345* (2013.01); *H04N 21/4382* (2013.01); *H04N 21/4385* (2013.01); *H04N 21/4394* (2013.01); *H04N 21/4398* (2013.01)

(58) Field of Classification Search
CPC .......... H04N 21/4384; H04N 21/4343; H04N 21/4382; H04N 21/4385; H04N 21/4394; H04N 21/4398; H04N 5/50; H04N 5/445; H04N 7/173
USPC .......... 725/100, 93, 131, 151; 348/731, 725
See application file for complete search history.

(56) References Cited

U.S. PATENT DOCUMENTS

| | | | |
|---|---|---|---|
| 8,149,744 B2* | 4/2012 | Song ............... | H04L 45/74 348/469 |
| 8,973,070 B2 | 3/2015 | Ramesh et al. | |

(Continued)

OTHER PUBLICATIONS

Kyungmo Park, "Draft text for ISO/IEC 23008-1 2nd edition", International Organisation for Standardisation, ISO/IEC JTC1/SC29/WG11, Coding of Moving Pictures and Audio, MPEG 2015/N15518, Jun. 2015, Warsaw, Poland, Total 155 pages.

(Continued)

*Primary Examiner* — Trang U Tran
(74) *Attorney, Agent, or Firm* — Sughrue Mion, PLLC (57) ABSTRACT

An image display apparatus and an image displaying method are provided. The image display apparatus includes a display; and a processor configured to parse information about a channel selected in response to a channel selection signal, determine whether to provide a plurality of services through the selected channel based on the parsed information, and, in response to the determining that the plurality of services are to be provided through the selected channel, obtain a plurality of service streams respectively corresponding to the plurality of services provided through the selected channel; and a decoder configured to decode one service stream from among the obtained plurality of service streams.

16 Claims, 8 Drawing Sheets

(51) Int. Cl.
*H04N 21/434* (2011.01)
*H04N 21/435* (2011.01)
*H04N 5/50* (2006.01)
*H04N 21/4385* (2011.01)
*H04N 21/439* (2011.01)

(56) References Cited

U.S. PATENT DOCUMENTS

| | | | |
|---|---|---|---|
| 9,282,315 B2* | 3/2016 | Suh | H04N 13/0059 |
| 2006/0194536 A1 | 8/2006 | Kim et al. | |
| 2008/0092203 A1* | 4/2008 | Bouazizi | H04N 5/4401 |
| | | | 725/135 |
| 2008/0307467 A1* | 12/2008 | Kim | H04L 65/605 |
| | | | 725/93 |
| 2012/0106677 A1 | 5/2012 | Lee et al. | |
| 2013/0223383 A1 | 8/2013 | Park et al. | |

OTHER PUBLICATIONS

"ATSC Candidate Standard: Signaling, Delivery, Synchronization, and Error Protection(A/331)", ATSC—Advanced Television Systems Committee, ATSC S33-174r1, Jan. 5, 2016, Total 131 pages.
Communication dated Sep. 1, 2017, from the European Patent Office in counterpart European Application No. 17166370.1.
Gordon Kent Walker et al., "Route/Dash IP Streaming-Based System for Delivery of Broadcast, Broadband, and Hybrid Services", IEEE Transactions on Broadcasting, vol. 62, No. 1, Mar. 2016 (pp. 328-337) XP011608972.

* cited by examiner

| SLT(Service List Table) |||
|---|---|---|
| FIRST SEVICE | serviceID | 1 |
| | serviceCategory | 1 (Linear A/V service) |
| | shortServiceName | Mobile service |
| SECOND SERVICE | serviceID | 2 |
| | serviceCategory | 4 (EPG service) |
| | shortServiceName | |
| THIRD SERVICE | serviceID | 3 |
| | serviceCategory | 2 (Linear audio only service) |
| | shortServiceName | |

IMAGE DISPLAY APPARATUS AND IMAGE DISPLAYING METHOD

CROSS-REFERENCE TO RELATED APPLICATION

This application claims priority from Korean Patent Application No. 10-2016-0046502, filed on Apr. 15, 2016, in the Korean Intellectual Property Office, the disclosure of which is incorporated herein by reference in its entirety.

BACKGROUND

1. Field

Methods and apparatuses consistent with aspects of one or more exemplary embodiments relate to displaying images, and more particularly, to a method and an apparatus for quickly outputting an image.

2. Description of the Related Art

Digital broadcasting provides a high-definition service compared with analog broadcasting, by converting an analog signal, such as video, audio, and other data, into a digital signal and compressing and transmitting the digital signal. Furthermore, digital broadcasting may provide a plurality of services via a single channel, thereby providing many pieces of content to users. As the number of services available to users increases, a method of quickly switching between provided services is required.

SUMMARY

According to an aspect of an exemplary embodiment, an image display apparatus includes a display; and a processor configured to parse information about a channel selected in response to a channel selection signal, determine whether to provide a plurality of services through the selected channel based on the parsed information, and, in response to a determination that the plurality of services are to be provided through the selected channel, obtain a plurality of service streams respectively corresponding to the plurality of services provided through the selected channel; and a decoder configured to decode one service stream from among the obtained plurality of service streams.

In response to receiving a user input for switching between services, the decoder may be further configured to decode a service stream corresponding to a switched-to service from among the obtained plurality of service streams.

The processor may include a plurality of data obtainers respectively corresponding to the plurality of services and the plurality of data obtainers may be further configured to obtain the plurality of service streams by using the plurality of data obtainers.

The processor may be further configured to generate a plurality of data obtainers respectively corresponding to the plurality of services and transmit network information associated with each of the plurality of services to each of the plurality of data obtainers.

Each of the plurality of data obtainer may be configured to search for packet identifiers (IDs) of audio data and video data of a corresponding service from among the plurality of services, based on the network information, and obtain the audio data and the video data based on the packet IDs found in the search.

The information about the selected channel may be service list table (SLT) information.

Data of the plurality of services may be broadcasting data that is provided according to an Advanced Television Systems Committee (ATSC) 3.0 standard.

According to an aspect of another exemplary embodiment, an image displaying method includes parsing information about a channel selected in response to a channel selection signal; determining, by a processor whether to provide a plurality of services through the selected channel based on the parsed information; in response to a determination that the plurality of services are to be provided through the selected channel, obtaining a plurality of service streams respectively corresponding to the plurality of services; decoding one service stream from among the obtained plurality of service streams; and outputting the decoded service stream.

The decoding may include, in response to receiving a user input for switching between services, decoding another service stream corresponding to a switched-to service from among the obtained plurality of service streams.

The obtaining of the plurality of service streams may include obtaining the plurality of service streams by a plurality of data obtainers respectively corresponding to the plurality of services.

The obtaining of the plurality of service streams may further include generating a plurality of data obtainers respectively corresponding to the plurality of services; and transmitting network information associated with each of the plurality of services to each of the plurality of data obtainers.

The obtaining of the plurality of service streams may further include searching for IDs of audio data and video data of a service corresponding to each of the plurality of data obtainer, based on the network information; and obtaining the audio data and the video data based on the packet IDs found during the searching.

The information about the selected channel may be SLT.

Data of the plurality of services may be broadcasting data that is provided according to an ATSC 3.0 standard.

BRIEF DESCRIPTION OF THE DRAWINGS

These and/or other aspects will become more apparent and more readily appreciated from the following description of exemplary embodiments, taken in conjunction with the accompanying drawings. Understanding that these drawings depict only exemplary embodiments and are not therefore to be considered to be limiting of the scope of the disclosure, the principles herein are described and explained with additional specificity and detail through the use of the accompanying drawings, in which.

DETAILED DESCRIPTION OF EXEMPLARY EMBODIMENTS

Exemplary embodiments are described in detail herein with reference to the accompanying drawings so that this present disclosure may be easily performed by one of ordinary skill in the art to which the present disclosure pertains. The present disclosure may, however, be embodied in many different forms and should not be construed as being limited to exemplary embodiments set forth herein. In the drawings, parts irrelevant to the description are omitted for simplicity of explanation, and like numeric references refer to analogous elements throughout.

Although general terms widely used at present were selected for describing exemplary embodiments in consideration of the functions thereof, these general terms may vary according to intentions of one of ordinary skill in the art, case precedents, the advent of new technologies, and the like. Hence, the terms must be defined based on their meanings and the contents of the entire specification, not by simply stating the terms.

The terms used in the present disclosure are merely used to describe exemplary embodiments, and are not intended to limit the scope of the present disclosure. An expression used in the singular encompasses the expression of the plural, unless it has a clearly different meaning in the context. Throughout the disclosure, when an element is referred to as being "connected" or "coupled" to another element, it can be directly connected or coupled to the other element, or can be electrically connected or coupled to the other element with intervening elements interposed therebetween. In addition, the terms "comprises" and/or "comprising" or "includes" and/or "including" when used in this disclosure, specify the presence of stated elements, but do not preclude the presence or addition of one or more other elements.

The use of the terms "a" and "an" and "the" and similar referents in the context of describing the present disclosure (especially in the context of the following claims) are to be construed to cover both the singular and the plural. Also, the steps of all methods described herein can be performed in any suitable order unless otherwise indicated herein or otherwise clearly contradicted by context. Exemplary embodiments are not limited to the described order of the operations.

Thus, the expression "according to an embodiment" or "according to an exemplary embodiment" used in the entire disclosure does not necessarily indicate the same exemplary embodiment.

The aforementioned exemplary embodiments may be described in terms of functional block components and various processing steps. Some or all of such functional blocks may be realized by any number of hardware and/or software components configured to perform the specified functions. For example, functional blocks according to the present disclosure may be realized by one or more microprocessors or by circuit components for a predetermined function. In addition, for example, functional blocks according to the present disclosure may be implemented with any programming or scripting language. The functional blocks may be implemented in algorithms that are executed on one or more processors. Furthermore, exemplary embodiments described herein could employ any number of conventional techniques for electronics configuration, signal processing and/or control, data processing and the like. The words "mechanism," "element," "means," and "configuration" are used broadly and are not limited to mechanical or physical exemplary embodiments.

Furthermore, the connecting lines or connectors between components shown in the various figures presented are intended to represent exemplary functional relationships and/or physical or logical couplings between the components. Connections between components may be represented by many alternative or additional functional relationships, physical connections or logical connections in a practical device.

The present disclosure will now be described more fully with reference to the accompanying drawings, in which exemplary embodiments are shown.

Figure 1:
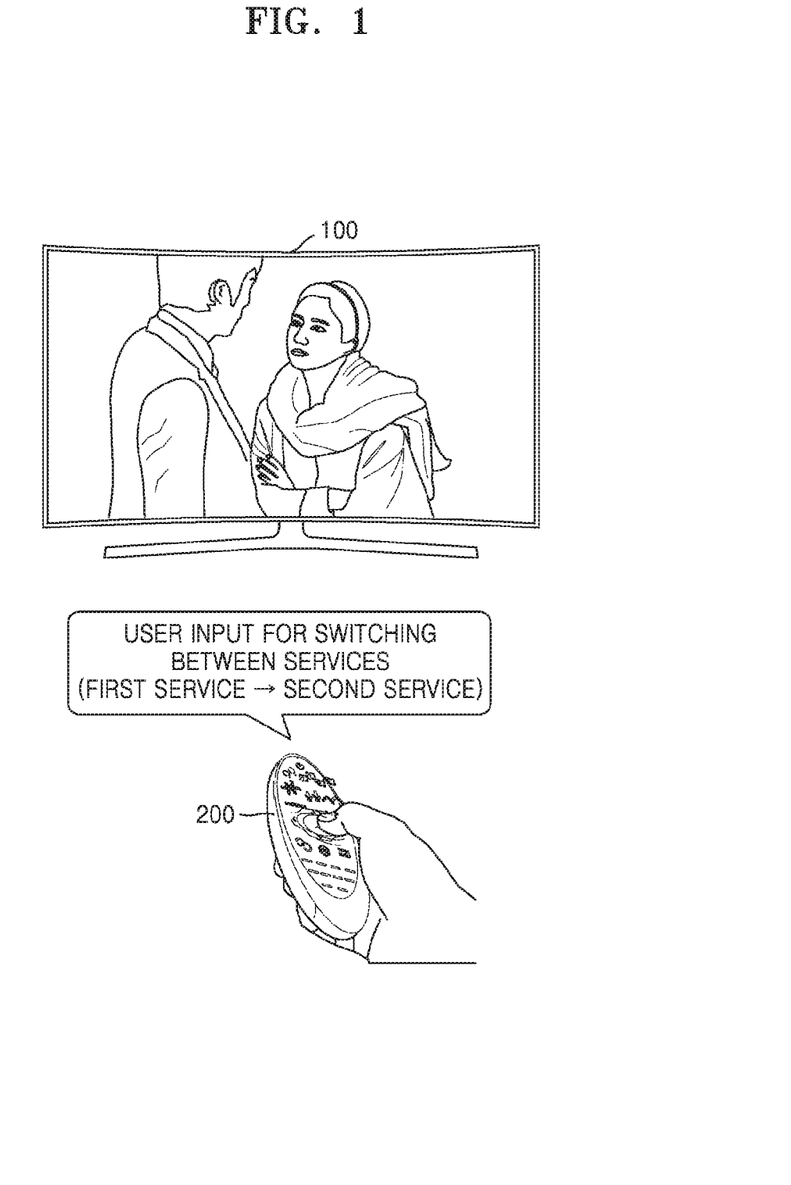
FIG. 1 is a view illustrating an image display apparatus according to an exemplary embodiment.

FIG. 1 illustrates an image display apparatus 100 according to an exemplary embodiment.

As shown in FIG. 1, the image display apparatus 100 may be a TV, but is not limited thereto. The image display apparatus 100 may be an electronic device including a display. For example, the image display apparatus 100 may be any type of electronic device, such as a mobile phone, a tablet personal computer (PC), a digital camera, a camcorder, a laptop computer, a desktop computer, an e-book terminal, a digital broadcast terminal, a personal digital assistant (PDA), a portable multimedia player (PMP), a navigation device, an MP3 player, or a wearable device. The image display apparatus 100 may be fixed or movable, or a digital broadcast receiver.

The image display apparatus 100 may be implemented as not only a flat image display apparatus but also a curved image display apparatus having a curvature or a flexible image display apparatus with an adjustable curvature. An output resolution of the image display apparatus 100 may be, for example, a high definition (HD), a full HD, an ultra HD, or a resolution that is clearer than an ultra HD.

When the image display apparatus 100 outputs a broadcasting signal, the image display apparatus 100 may provide a plurality of services through a single channel. For example, the image display apparatus 100 may provide both a service for providing HD content and a service for providing standard definition (SD) content through a single channel. A single channel may also provide all various additional services including broadcasting content and program information (for example, an electronic program guide (EPG)), but exemplary embodiments are not limited thereto. As described above, providing a plurality of services through a single channel may be referred to as a multi-mode service (MMS), but may be referred to differently according to exemplary embodiments. For convenient use of a plurality of services, a method capable of switching between services in response to a user input for switching between services is necessary.

When an image display apparatus monitors only a service stream corresponding to a service selected from among a plurality of services, a process of receiving a user input for switching between services, for example from a remote controller 200, and then acquiring a service stream corresponding to a switched-to service is necessary. Accordingly, the image display apparatus has difficulty in quickly switching between services in response to a user input for switching between services.

The image display apparatus may quickly switch between services by acquiring a plurality of service streams respectively corresponding to a plurality of services that are provided through a selected channel. In response to a user input, via the remote controller 200, for switching between services, the image display apparatus obtains a service stream corresponding to a switched-to service, thereby quickly decoding and outputting the service stream corresponding to the switched-to service. Accordingly, the image display apparatus may quickly switch between services in response to a user input for switching between services.

For example, a system in which the image display apparatus 100 provides only one service through one channel is based on Advanced Television System Committee (ATSC) 1.0, which is a digital broadcasting standard. In ATSC 3.0, which is a higher version of ATSC 1.0, the image display apparatus 100 may provide a plurality of services through a single channel. In ATSC 1.0, even when the image display apparatus 100 does not monitor a service stream in advance, when the image display apparatus 100 switches from a current channel to another channel, the image display apparatus 100 may provide a channel switching speed from which users do not feel uncomfortable. However, in ATSC 3.0, which is capable of providing a plurality of services through a single channel, a channel switching speed or a service switching speed may be significantly lower than that in ATSC 1.0, because of the characteristics of ATSC 3.0. Thus, when the image display apparatus 100 previously monitors a plurality of service streams that are provided through a single channel, and receives a user input for switching between channels, the image display apparatus 100 may decode the previously-monitored service streams to thereby quickly switch between services.

Figure 2:
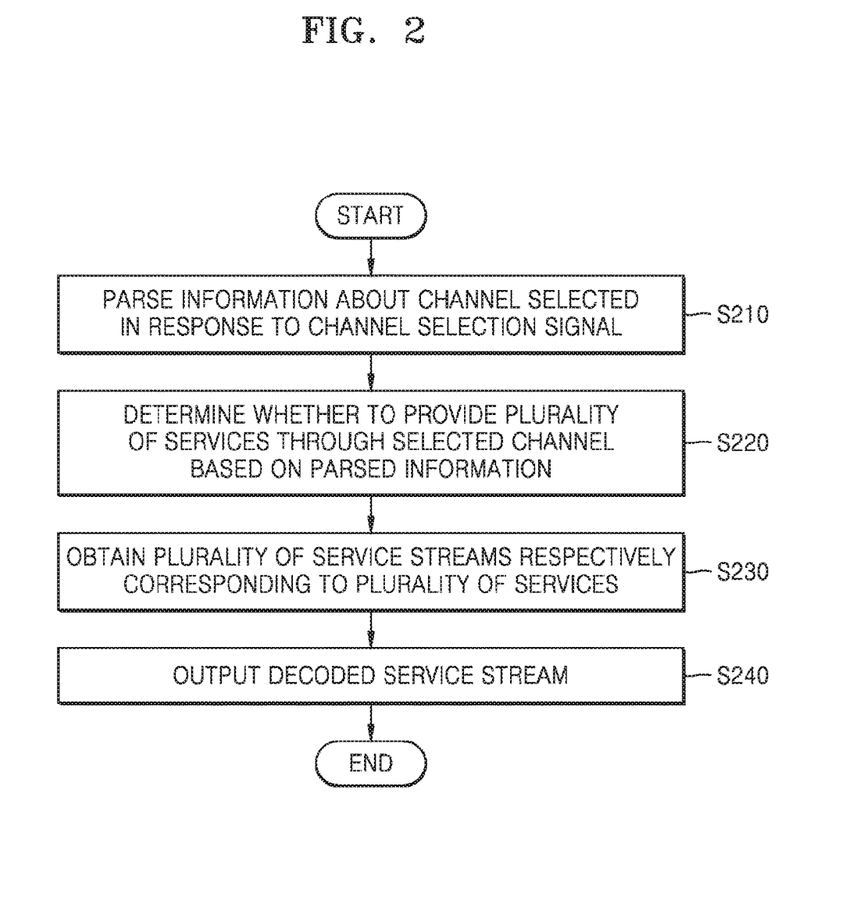
FIG. 2 is a flowchart illustrating an image displaying method according to an exemplary embodiment.

FIG. 2 is a flowchart illustrating an image displaying method according to an exemplary embodiment.

In operation S210, the image display apparatus 100 determines whether to provide a plurality of services through a selected channel, by parsing information about the selected channel selected in response to a channel selection signal.

The plurality of services that are to be provided through the selected channel may include a broadcasting service, wherein the broadcasting service may be, but is not limited to, a broadcasting service that is transmitted according to the ATSC standard.

The image display apparatus 100 may check information about the services provided through the selected channel, by parsing the information about the selected channel. For example, when the services provided through the selected channel are broadcasting services that are transmitted according to the ATSC standard, the information about the selected channel may be service list table (SLT) information. The SLT information may include, but is not limited to, service identifiers (IDs) for identifying a plurality of services provided through a channel, service categories, and service names. The image display apparatus may determine whether to provide a plurality of services through a selected channel, by parsing the SLT information.

In operation S220, the image display apparatus 100 obtains a plurality of service streams respectively corresponding to the plurality of services provided through the selected channel, in response to a determination that the plurality of services are to be provided through the selected channel.

The image display apparatus 100 may generate a plurality of data obtainers respectively corresponding to the plurality of services. Each data obtainer may be used to obtain a service stream corresponding to each service. For example, when the selected channel provides three services, the image display apparatus 100 may generate three data obtainers, and may obtain service streams respectively corresponding to the three services by using the generated three data obtainers. According to an exemplary embodiment, each data obtainer may be referred to as a service stream monitoring component, but exemplary embodiments are not limited thereto.

The image display apparatus 100 may transmit network information associated with a service to a data obtainer corresponding to the service. For example, the image display apparatus 100 may transmit User Datagram Protocol (UDP) port information allocated to each of the plurality of services to a data obtainer corresponding to each service. The data obtainer may monitor a UDP port indicated by the received UDP port information to thereby obtain a service stream received through the UDP port. The service stream output by the image display apparatus 100 may include an audio signal and a video signal. Accordingly, to output the service stream, a process of obtaining the audio signal and the video signal is necessary. To obtain the audio signal and the video signal, the image display apparatus 100 needs to check packet IDs of the audio signal and the video signal.

The data obtainer may search for the packet IDs of the audio signal and the video signal from the service stream received through the UDP port. The data obtainer may obtain the audio signal and the video signal, based on the searched packet IDs. For example, a packet having a packet ID of 0 in the service stream received through the UDP port may include information about the packet IDs of the audio signal and the video signal included in the service stream. Then, the image display apparatus 100 may check the packet IDs of the audio signal and the video signal from the packet having the packet ID of 0. For example, the image display apparatus 100 may determine, from the packet having the packet ID of 0, that the packet ID of the audio signal is 10 and the packet ID of the video signal is 11. Then, the image display apparatus 100 may obtain the audio signal by monitoring a packet having a packet ID of 10 and obtain the video signal by monitoring a packet having a packet ID of 11.

In operation S230, the image display apparatus 100 decodes one service stream from among the plurality of service streams.

The image display apparatus 100 may obtain the service streams corresponding to the plurality of services provided by the selected channel, by using the plurality of data obtainers. The image display apparatus 100 may decode the service stream selected from the obtained plurality of service streams. For example, in response to a user input for selecting a first service, the image display apparatus 100 may decode a service stream corresponding to the first service. At this time, even when the first service is selected and the service stream corresponding to the first service is decoded, the image display apparatus 100 may continuously obtain a service stream corresponding to a second service. For convenience of explanation, the service stream corresponding to the first service will now be referred to as a first service stream, and the service stream corresponding to the second service will now be referred to as a second service stream.

When the image display apparatus 100 receives a user input for switching between services (for example, a user input for switching from the first service to the second service), the image display apparatus 100 may decode a service stream corresponding to a switched service from among the obtained plurality of service streams.

For example, in response to a user input for switching from the first service to the second service, the image display apparatus 100 may stop decoding the first service stream and may decode the second service stream. At this time, the image display apparatus 100 has already monitored and obtained the second service stream. Accordingly, the image display apparatus 100 may not obtain the second service stream corresponding to the second service in response to a signal for switching to the second service, but may provide a previously-obtained second service stream as a decoding input. Accordingly, the image display apparatus 100 may reduce the time taken to obtain the second service stream. In operation S240, the image display apparatus 100 may output a decoded service stream.

The image display apparatus 100 may output the decoded service stream in a video or audio form, but exemplary embodiments are not limited thereto. For example, the image display apparatus 100 may output the decoded service stream in a video form through a screen or output the decoded service stream in an audio form through a speaker.

As described above, according to an exemplary embodiment, since the image display apparatus 100 obtains the plurality of service streams corresponding to the plurality of services provided through the selected channel, the image display apparatus 100 may quickly switch between services in response to a user input for switching between services. Since the image display apparatus 100 obtains the plurality of service streams corresponding to the plurality of services provided through the selected channel, the image display apparatus 100 may quickly decode the service stream corresponding to a switched service.

Figure 3:
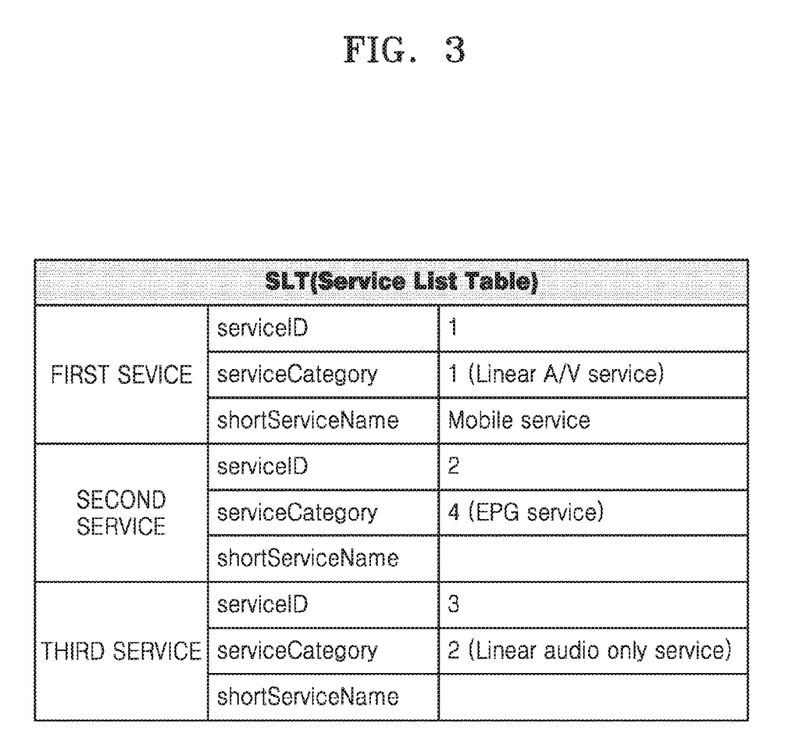
FIG. 3 is a view illustrating service list table (SLT) information according to an exemplary embodiment.

FIG. 3 illustrates SLT information according to an exemplary embodiment.

When the plurality of services are broadcasting services transmitted according to the ATSC standard, the image display apparatus 100 may obtain information about the plurality of services from SLT information.

ATSC is a digital broadcasting standard adopted by countries including the USA and Canada, and Korea also adopts the ATSC technique. The ATSC standard has been updated to ATSC 3.0, which provides high compression efficiency compared with ATSC 1.0, which is an older version of the digital broadcasting standard, and accordingly provides more efficient use of frequency. Because the ATSC 3.0 transmits all broadcasting signals using an Internet Protocol (IP), the ATSC 3.0 enables a service which is a combination of broadcasting and the Internet.

The SLT information includes information about a plurality of services provided through a single channel. For example, when a first channel provides three services, SLT information corresponding to the first channel may include information about the three services provided through the first channel.

The SLT information may include, but is not limited to, service IDs for identifying the plurality of services, service categories, and service names. For example, as shown in FIG. 3, the SLT information may include service IDs of the three services provided through the first channel, service categories, and service names.

Referring to FIG. 3, because a service ID is information for identifying each service, services have their own unique ID values. For example, as shown in FIG. 3, service IDs of first through third services may be set to be consecutive values of 1 through 3 or may be allocated arbitrary values by a broadcasting company.

The SLT information may include service category information. For example, as shown in FIG. 3, the service category information may include, but is not limited to, information indicating whether each service is an audio/video (A/V) service, an application-based service, or an audio-only service.

The image display apparatus 100 may determine whether to provide a plurality of services through a selected channel, by parsing the SLT information. When it is determined that the selected channel provides the plurality of services, the image display apparatus 100 may generate a plurality of data obtainers respectively corresponding to the plurality of services.

Figure 4:
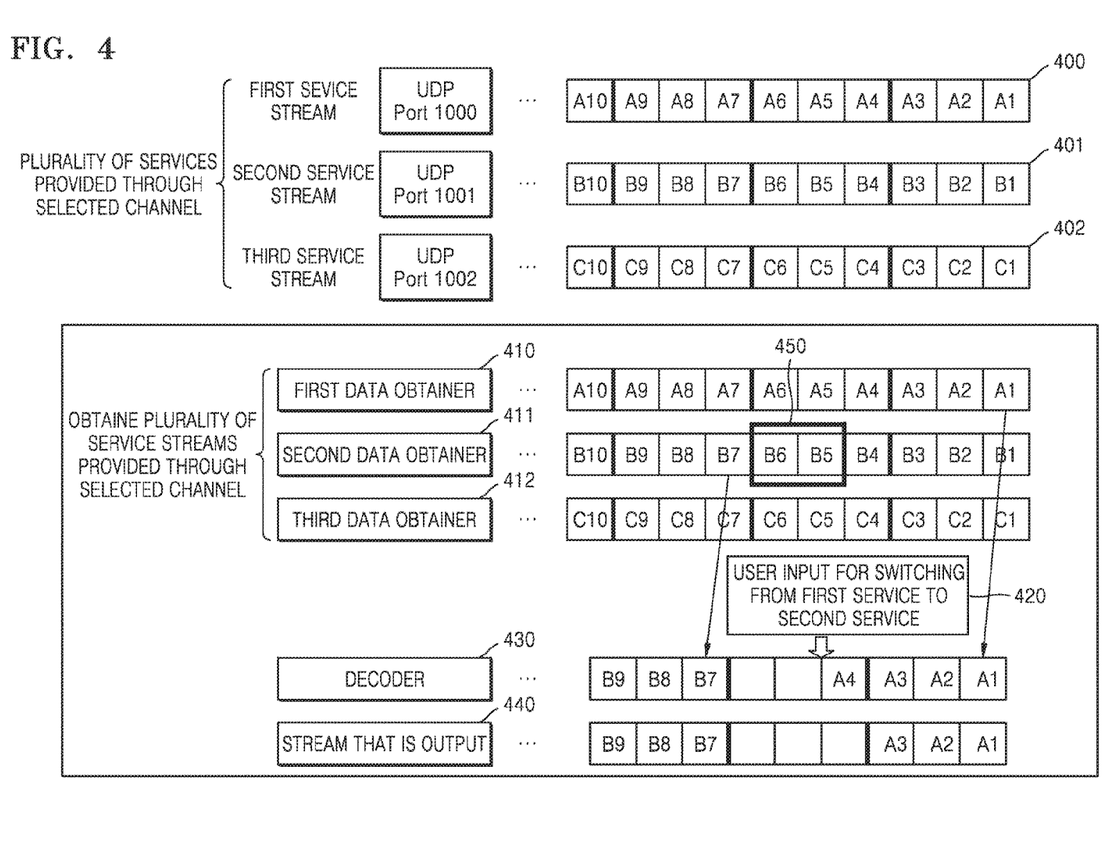
FIG. 4 is a schematic diagram illustrating an image displaying method according to an exemplary embodiment.

FIG. 4 is a schematic diagram illustrating an image displaying method according to an exemplary embodiment.

For convenience of explanation, FIG. 4 illustrates a case where a selected first channel provides three services.

Referring to FIG. 4, the first channel may provide three services (for example, the first through third services). In this case, UDP ports allocated to the three services are 1000 through 1002, and service streams 400 through 402 (first through third service streams) respectively corresponding to the three services may be received through the allocated UDP ports 1000 through 1002.

When it is determined that the first channel provides three services, the image display apparatus 100 may generate three data obtainers 410 through 412 (first through third data obtainers). The first through third data obtainers 410 through 412 may be used to obtain the first through third service streams 400 through 402. For example, as shown in FIG. 3, the first data obtainer 410 may obtain the first service stream 400, the second data obtainer 411 may obtain the second service stream 401, and the third data obtainer 412 may obtain the third service stream 402.

According to an exemplary embodiment, the image display apparatus 100 may generate a smaller number of data obtainers than the number of services provided by a channel. For example, when a selected channel provides five services (first through fifth services), the image display apparatus 100 may generate three data obtainers. The image display apparatus 100 may obtain the service streams corresponding to a currently-being-output service and services adjacent thereto, by using the three data obtainers.

For example, when the currently-being-output service is the second service, the image display apparatus 100 may obtain a service stream corresponding to the second service and service streams corresponding to the first service and the third service adjacent to the second service. When the currently-being-output service is the second service and is switched by a user by using a direction key, services to which the currently-being-output service is switchable are the first service and the third service, which are adjacent to the second service. The image display apparatus 100 may obtain a service stream corresponding to a service to which the currently-being-output service is highly likely to switch, by using fewer data obtainers than the number of services provided by a channel.

The image display apparatus 100 may decode one service stream selected from the obtained plurality of service streams. For example, when the first service is selected, the image display apparatus 100 may decode the first service stream obtained through the first data obtainer 410. At this time, the image display apparatus 100 may decode the first service stream by using a decoder 430.

A single service stream may include a plurality of packets. For example, referring to FIG. 4, the first through third service streams 400 through 402 may include A1 through A10 packets, B1 through B10 packets, and C1 through C10 packets, respectively. The image display apparatus 100 may decode a service stream in units of a preset number of packets. For example, the image display apparatus 100 may decode a service stream in units of three packets. Referring to FIG. 4, the image display apparatus 100 may decode the first service stream obtained by the first data obtainer 410 in units of A1 through A3 packets, A4 through A6 packets, and A7 through A9 packets.

In response to a user input for switching between services, the image display apparatus 100 may decode a service stream corresponding to a switched-to service from among the obtained plurality of service streams. For example, in response to a user input for switching from the first service to the second service, the image display apparatus 100 may decode the second service stream obtained through the second data obtainer 411.

As shown in FIG. 4, in response to a user input 420 of switching between services (switching from the first service to the second service), the image display apparatus 100 may stop decoding the first service stream 400 and may decode the second service stream 401. In this case, because a service stream is decoded in units of three packets, B5 and B6 packets 450 may not be decoded. Accordingly, the second service stream initially decoded by the image display apparatus 100 may be B7 through B9 packets. The image display apparatus 100 obtains the second service stream 401 by using the second data obtainer 411. Accordingly, the image display apparatus 100 has only to use the already-obtained B7 through B9 packets without needing to spend time to obtain the B7 through B9 packets. The image display apparatus 100 may quickly decode and output the second service stream by using the second service stream obtained by the second data obtainer 411. Accordingly, the image display apparatus 100 may quickly switch between services in response to a user input for switching between services.

Figure 5A:
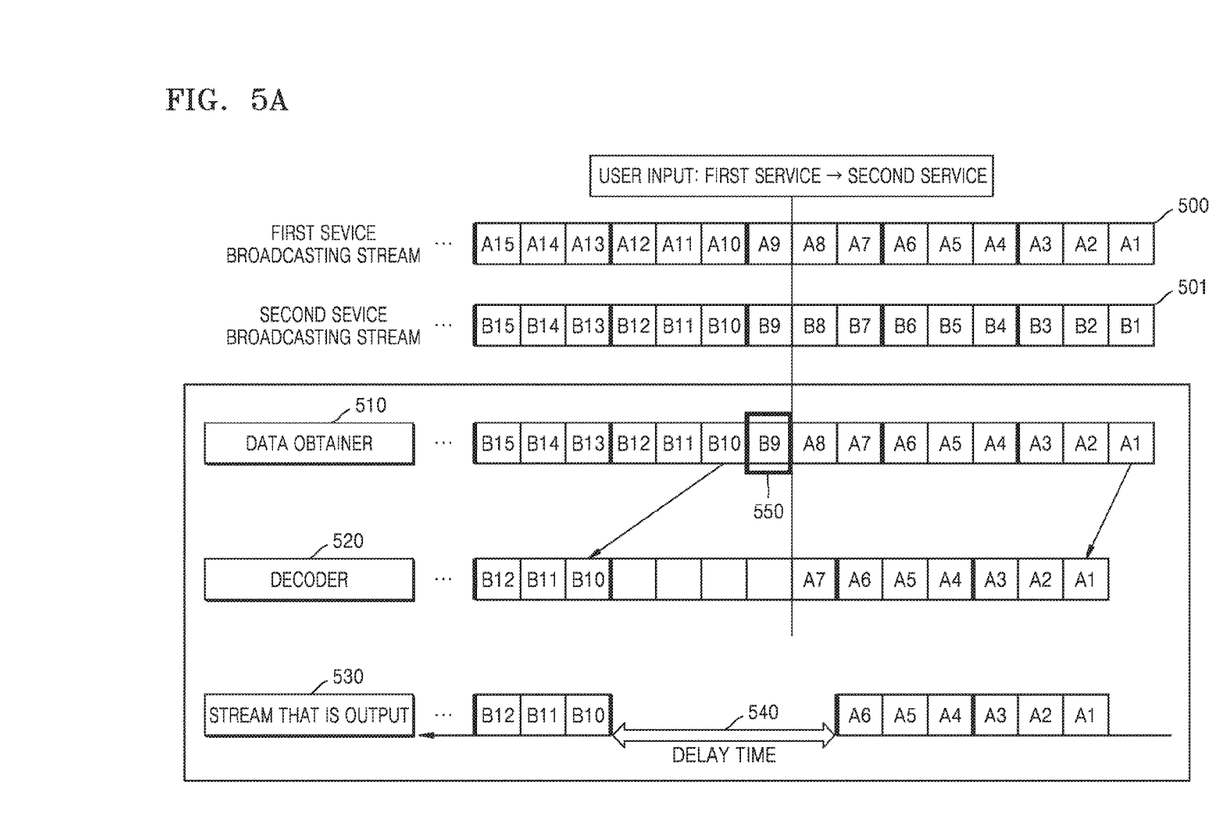
FIGS. 5A and 5B are schematic diagrams illustrating an image displaying method according to an exemplary embodiment.
Figure 5B:
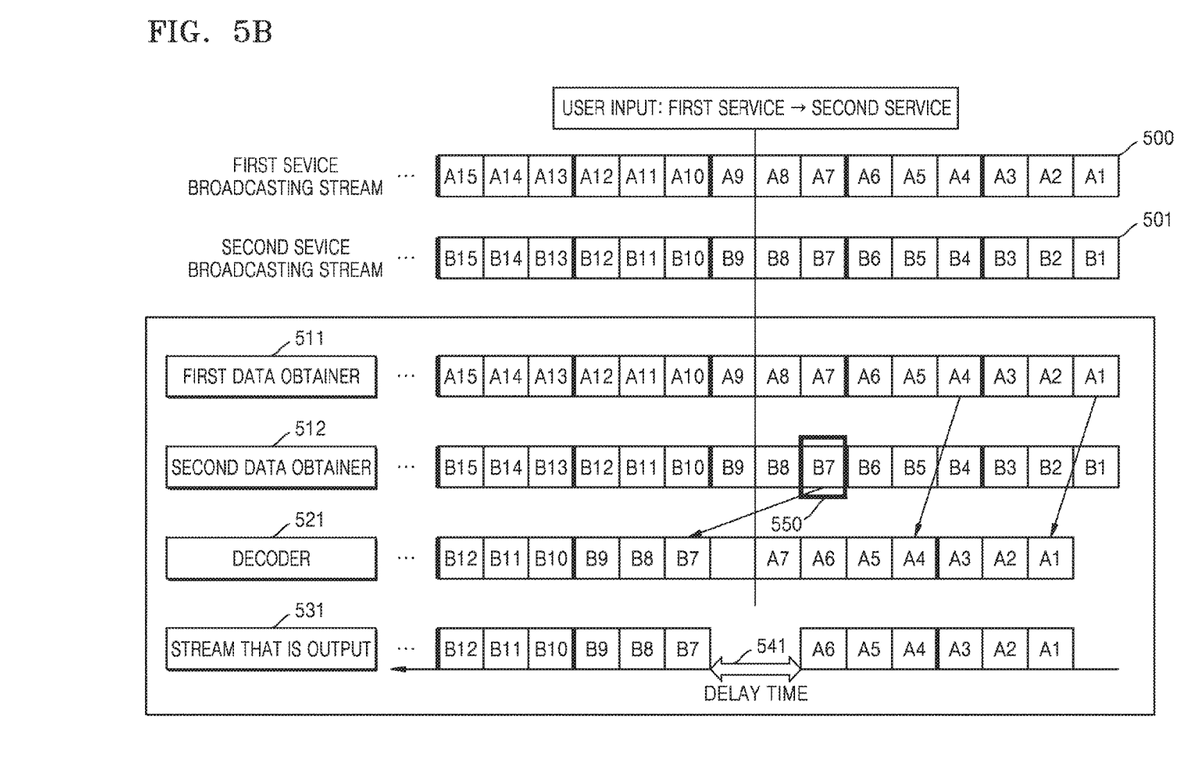

FIGS. 5A and 5B are views illustrating a time point in which the image display apparatus 100 switches between services, according to an exemplary embodiment. For convenience of explanation, a case where a selected channel provides two services will now be illustrated.

FIG. 5A illustrates a case where the image display apparatus 100 obtains only a service stream corresponding to a selected service.

The image display apparatus 100 may obtain the service stream corresponding to the selected service by using a single data obtainer 510. For example, referring to FIG. 5A, the data obtainer 510 may obtain a first service stream 500 and then, in response to a user input for switching from a first service to a second service, may obtain a second service stream 501.

In response to a user input for switching between services, the image display apparatus 100 may stop decoding the first service stream 500 and may decode the second service stream 501. For example, as shown in FIG. 5A, when a service stream is decoded in units of three packets, a B9 packet 550 is not decoded, and a B10 packet included in the second service stream 501 may start being decoded. In this case, a delay time may be generated until the B10 packet is input to a decoder 520, because of a time taken for the data obtainer 510 to obtain the second service stream 501 after receiving the user input for switching between services. Accordingly, the image display apparatus 100 generates a delay time 540 when outputting the second service stream 501.

For example, as shown in FIG. 5A, the image display apparatus 100 may monitor only packets corresponding to a single service stream by using the single data obtainer 510, and the decoder 520 may perform decoding in units of packets, the number of which corresponds to one second of time. At this time, in response to the user input for switching between services, the data obtainer 510 may obtain packets, the number of which corresponds to one second of time, and transmit the obtained packets to the decoder 520. Accordingly, when only packets corresponding to a single service are monitored by using the single data obtainer 510 and services are switched, a delay that is the same length as a time period (e.g., one second) taken to obtain the packets of a switched service may be generated.

FIG. 5B is a view illustrating the image display apparatus 100 obtaining a plurality of service streams corresponding to a plurality of services according to an exemplary embodiment.

For example, when a selected channel provides two services, the image display apparatus 100 may generate two data obtainers and may obtain two service streams respectively corresponding to the two services by using the two data obtainers. Referring to FIG. 5B, the image display apparatus 100 may generate a first data obtainer 511 and a second data obtainer 512. The first data obtainer 511 and the second data obtainer 512 may obtain the first service stream 500 and the second service stream 501, respectively. Accordingly, even when a currently-being-output service is the first service stream 500, the second data obtainer 512 may obtain the second service stream 501.

In response to a user input for switching from the first service to the second service, the image display apparatus 100 may stop decoding the first service stream 500 and may decode the second service stream 501. As shown in FIG. 5B, when a service stream is decoded in units of three packets, a B9 packet 550 of the second service stream 501 is not decoded, and a B10 packet included in the second service stream 501 may start being decoded. In this case, because the second data obtainer 512 obtains the second service stream 502, the image display apparatus 100 does not need to spend time to obtain the second service stream 502 after receiving the user input for switching from the first service to the second service. The image display apparatus 100 has only to transmit the second service stream 501 having already been obtained by the second data obtainer 512. Accordingly, the image display apparatus 100 may quickly output the second service stream 501 in comparison to a case described with reference to FIG. 5A.

As described above, the image display apparatus 100 may obtain the plurality of service streams corresponding to the plurality of services to thereby generate a reduced delay time 541 taken to output the first service stream 500 and then to output the second service stream 501 in response to a switch from the first service to the second service.

Figure 6:
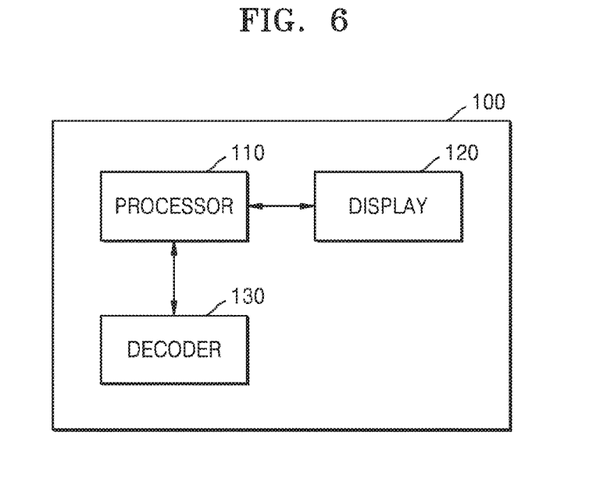
FIG. 6 is a block diagram illustrating a structure of an image display apparatus according to an exemplary embodiment.

FIG. 6 is a block diagram of a structure of an image display apparatus 100 according to an exemplary embodiment.

Referring to FIG. 6, the image display apparatus 100 may include a processor 110, a display 120, and a decoder 130. However, the image display apparatus 100 may be implemented by more or less components than the components illustrated in FIG. 6.

The aforementioned components will now be described in detail according to an exemplary embodiment.

The processor 110 parses information about a channel selected in response to a signal, thereby determining whether to provide a plurality of services through the selected channel. For example, the processor 110 may determine whether to provide the plurality of services through the selected channel, by parsing SLT information.

The processor 110 obtains a plurality of service streams respectively corresponding to the plurality of services provided through the selected channel, in response to a determination that the plurality of services are to be provided through the selected channel. The processor 110 may obtain the plurality of service streams by using data obtainers respectively corresponding to the plurality of services. For example, when it is determined that the selected channel provides the plurality of services, the processor 110 may generate a plurality of data obtainers respectively corresponding to the plurality of services. The processor 110 may transmit network information allocated to each service to a data obtainer corresponding to the each service. Each data obtainer may search for packet IDs of audio data and video data based on the network information, and may obtain the audio data and the video data based on the searched packet IDs. A processor 110 is a hardware component which may execute software thereon.

The decoder 130 decodes one service stream from among the obtained plurality of service streams. In response to a user input for switching between services, the decoder 130 may decode a service stream corresponding to a switched service from among the obtained plurality of service streams.

The display 120 may output a decoded service stream under the control of the processor 110.

When the display 120 forms a layer structure together with a touch pad to construct a touch screen, the display 120 may be used as an input device as well as an output device according to an exemplary embodiment.

Figure 7:
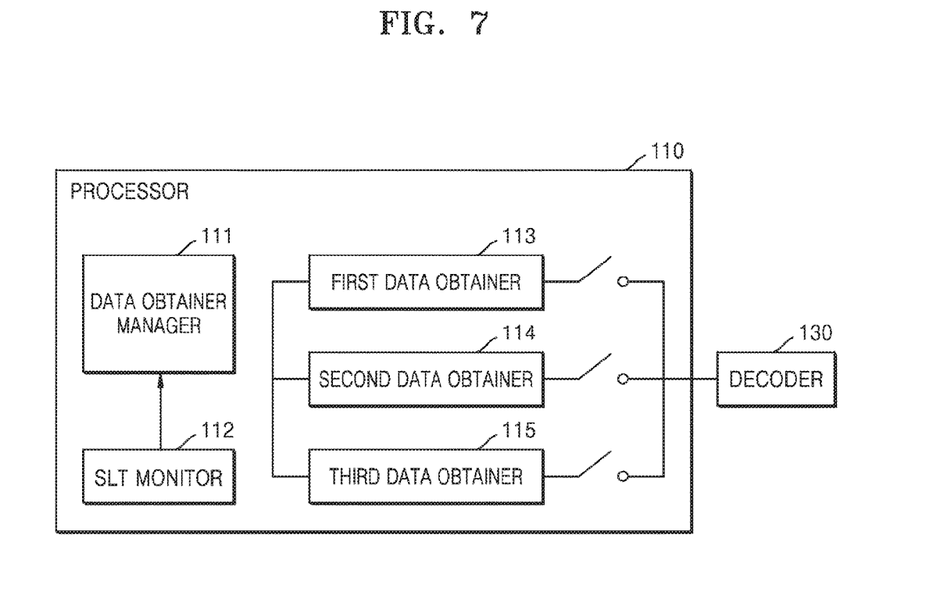
FIG. 7 is a block diagram illustrating a structure of a processor included in the image display apparatus, according to an exemplary embodiment.

FIG. 7 is a block diagram of a structure of a processor according to an exemplary embodiment.

The processor 110 may include a plurality of data obtainers 113 through 115, a data obtainer manager 111, and an SLT monitor 112.

The number of data obtainers 113 through 115 may be identical to the number of services that are provided by a single channel. For example, when a single channel provides three services, the processor 110 may include first through third data obtainers 113 through 115, as shown in FIG. 7. However, according to an exemplary embodiment, the processor 110 may include less data obtainers than the services that are provided.

Each of the first through third data obtainers 113 through 115 may be used to monitor and obtain a service stream corresponding to each service.

When it is determined that a selected channel provides a plurality of services, the data obtainer manager 111 may generate the plurality of data obtainers 113 through 115.

The data obtainer manager 111 may control the generated plurality of data obtainers 113 through 115. In response to a user input for switching between services, the data obtainer manager 111 may control a currently-being-output service stream to stop being decoded and a switched service stream to be decoded. At this time, the data obtainer manager 111 may connect the plurality of data obtainers 113 through 115 to a decoder 130 via a switching operation. For example, in response to a user input for switching from the first service to the second service, the data obtainer manager 111 may control the first data obtainer 113 to be disconnected from the decoder 130, and control the second data obtainer 114 to be connected to the decoder 130.

The SLT monitor 112 may obtain information about the services provided through the selected channel, by parsing SLT information corresponding to the selected channel. The SLT monitor 112 may transmit the information about the services provided through the selected channel to the data obtainer manager 111.

Although the processor 110 includes the plurality of data obtainers 113 through 115, the data obtainer manager 111, and the SLT monitor 112 in FIG. 7, the processor 110 may include less component than the aforementioned components according to another exemplary embodiment. In other words, according to need, two or more components are combined into a single component, or a single component may be divided into two or more components.

Figure 8:
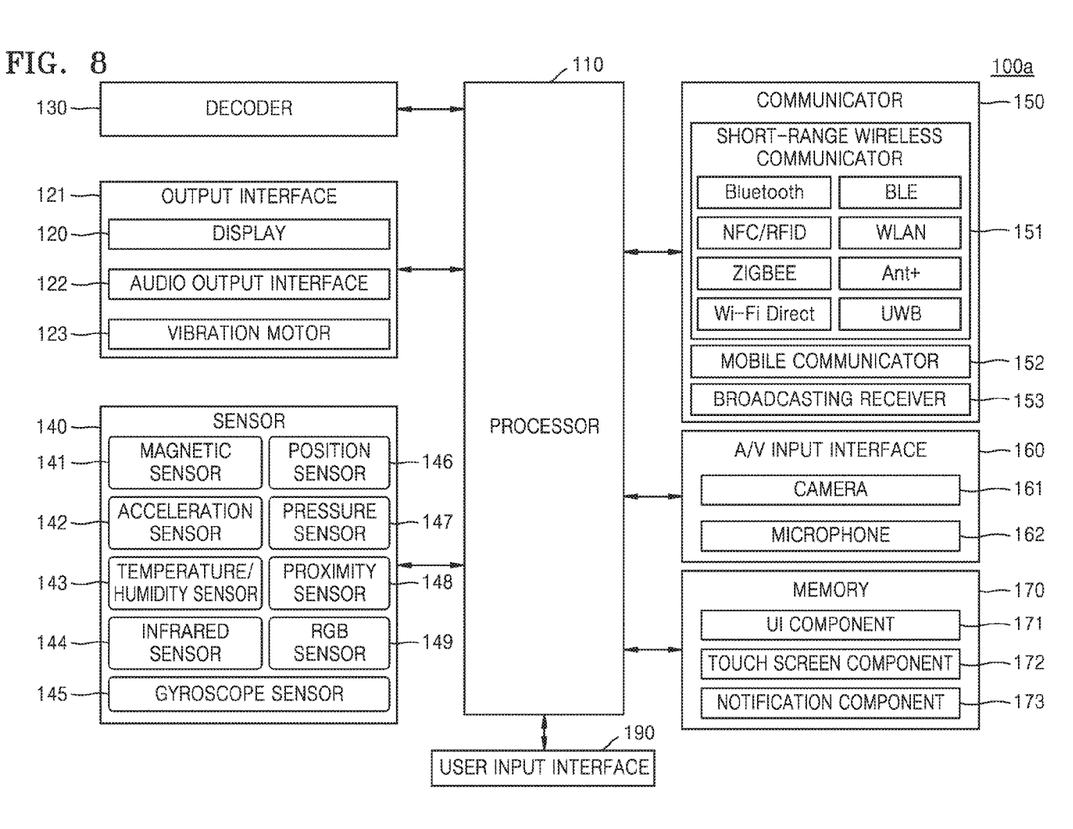
FIG. 8 is a block diagram illustrating a structure of an image display apparatus according to another exemplary embodiment.

FIG. 8 is a block diagram illustrating a structure of an image display apparatus according to yet another exemplary embodiment.

As illustrated in FIG. 8, the first device 100a such as an image display apparatus may further include a user input interface 190, a sensor 140, a communicator 150, an A/V input interface 160, and a memory 170, in addition to the processor 110, the display 120, and the decoder 130.

With regard to the processor 110 and the display 120, elements and features as described with reference to FIG. 6 will not be repeated.

The user input interface 190 refers to an interface via which a user inputs data for controlling the image display apparatus 100a. For example, the user input interface 190 may be, but is not limited to, a key pad, a dome switch, a touch pad (e.g., a capacitive overlay type, a resistive overlay type, an infrared beam type, an integral strain gauge type, a surface acoustic wave type, a piezo electric type, or the like), a jog wheel, or a jog switch.

The user input interface 190 may refer to a user input for switching between services in the image display apparatus 100a. When the user input interface 190 includes a key pad or a dome switch, the user input for switching between services may be an input of clocking or pressing a key corresponding to a specific number or a specific direction. When the user input interface 190 includes a touch pad, the user input for switching between services may be an input of touching a key corresponding to a specific number or a specific direction, but embodiments are not limited to the aforementioned example.

The user input interface 190 may be a component of a control device or a component of the image display apparatus 100a.

An output interface 121 may include the display 120, an audio output interface 122, and a vibration motor 123.

The audio output interface 122 outputs audio data that is received from the communicator 150 or stored in the memory 170. For example, the audio output interface 122 may output an audio signal of a service stream received through a UDP port. The audio output interface 122 also outputs an audio signal (for example, a call signal receiving sound, a message receiving sound, or a notification sound) related with a function of the image display apparatus 100a. The audio output interface 122 may include, for example, a speaker and a buzzer.

The vibration motor 123 may output a vibration signal. For example, the vibration motor 123 may output a vibration signal corresponding to an output of audio data or video data (for example, a call signal receiving sound or a message receiving sound). The vibration motor 123 may also output a vibration signal when a touch screen is touched.

The sensor 140 may sense the status of the image display apparatus 100a or the status of the surrounding of the image display apparatus 100a and may transmit information corresponding to the sensed status to the processor 110.

The sensor 140 may include, but is not limited to, at least one selected from a magnetic sensor 141, an acceleration sensor 142, a temperature/humidity sensor 143, an infrared sensor 144, a gyroscope sensor 145, a position sensor (e.g., a global positioning system (GPS)) 146, a pressure sensor 147, a proximity sensor 148, and an RGB sensor 149 (i.e., an illuminance sensor). Functions of most of the sensors would be instinctively understood by one of ordinary skill in the art in view of their names and thus detailed descriptions thereof will be omitted herein.

The communicator 150 may include at least one component that enables the image display apparatus 100*a* to perform communication with an external device. For example, the communicator 150 may include a short-range wireless communicator 151, a mobile communicator 152, and a broadcasting receiver 153 such as a tuner.

The short-range wireless communicator 151 may include, but is not limited to, a Bluetooth communicator, a Bluetooth Low Energy (BLE) communicator, a near field communication (NFC) component, a wireless local area network (WLAN) (e.g., Wi-Fi) communicator, a ZigBee communicator, an infrared Data Association (IrDA) communicator, a Wi-Fi direct (WFD) communicator, an ultra wideband (UWB) communicator, an Ant+ communicator, and the like.

The mobile communicator 152 may exchange a wireless signal with at least one selected from a base station, an external terminal, and a server on a mobile communication network. Here, examples of the wireless signal may include a voice call signal, a video call signal, and various types of data according to text/multimedia messages transmission.

The broadcasting receiver 153 receives a broadcasting signal and/or broadcasting-related information from an external source through a broadcasting channel. The broadcasting channel may be a satellite channel, a ground wave channel, or the like. The broadcasting receiver 153 may receive a plurality of service streams respectively corresponding to a plurality of services provided by a single channel. The broadcasting receiver 153 may receive a broadcasting signal that is transmitted according to the ATSC standard.

The A/V input interface 160 inputs an audio signal or a video signal, and may include a camera 161 and a microphone 162.

The camera 161 may obtain an image frame, such as a still image or a moving picture, via an image sensor in a video call mode or a photography mode. An image captured via the image sensor may be processed by the processor 110 or a separate image processor (not shown).

The image frame obtained by the camera 161 may be stored in the memory 170 or transmitted to the outside through the communicator 150. At least two cameras 161 may be included according to embodiments of the image display apparatus 100*a*.

The microphone 162 receives an external audio signal and converts the external audio signal into electrical audio data. For example, the microphone 162 may receive an audio signal from an external device or a speaking person. The microphone 162 may use various noise removal algorithms in order to remove noise that is generated while receiving the external audio signal.

The memory 170 may store a program used by the processor 110 to perform processing and control, and may also store data that is input to or output from the image display apparatus 100*a*. The memory 170 may store service streams obtained by a plurality of data obtainers.

The memory 170 may include at least one type of storage medium selected from among a flash memory type, a hard disk type, a multimedia card micro type, a card type memory (for example, a secure digital (SD) or extreme digital (XD) memory), a random access memory (RAM), a static random access memory (SRAM), a read-only memory (ROM), an electrically erasable programmable ROM (EEPROM), a programmable ROM (PROM), magnetic memory, a magnetic disk, and an optical disk.

According to an exemplary embodiment, the memory 170 may include a module including at least one instruction for parsing information about a channel selected in response to a channel selection signal to determine whether to provide a plurality of services through the selected channel, obtaining a plurality of service streams respectively corresponding to the plurality of services provided through the selected channel, in response to a determination that the plurality of services are to be provided through the selected channel, and decoding one service stream from among the obtained plurality of service streams.

The programs stored in the memory 170 may be classified into a plurality of modules according to their functions, for example, a user interface (UI) module 171, a touch screen module 172, and a notification module 173.

The UI component 171 may provide a UI, a graphical user interface (GUI), or the like that is specialized for each application and interoperates with the image display apparatus 100*a*. The touch screen component 172 may detect a touch gesture on a touch screen of a user and transmit information regarding the touch gesture to the processor 110. The touch screen component 172 according to an exemplary embodiment may recognize and analyze a touch code. The touch screen component 172 may be configured by separate hardware including a processor.

The notification component 173 may generate a signal for notifying that an event has been generated in the image display apparatus 100*a*. Examples of the event generated in the image display apparatus 100*a* may include call signal receiving, message receiving, a key signal input, schedule notification, and the like. The notification component 173 may output a notification signal in the form of a video signal via the display 120, in the form of an audio signal via an audio output interface 122, or in the form of a vibration signal via the vibration motor 123. For example, in response to a user input for switching between services, the notification component 173 may output a notification signal in the form of a vibration signal.

The block diagrams of the image display apparatuses 100 and 100*a* shown in FIGS. 6 and 8 are only exemplary embodiments. Components illustrated in FIGS. 6 and 8 may be combined or omitted according to the specifications of the image display apparatuses 100 and 100*a* when being actually implemented, or additional components may be included in the block diagrams of FIGS. 6 and 8. In other words, according to need, two or more components are combined into a single component, or a single component may be divided into two or more components. A function performed in each block is only an example to explain exemplary embodiments, and a detailed operation or device of each block does not limit the scope of the exemplary embodiments.

Disclosed exemplary embodiments may be embodied as program commands executable by various computer means and may be recorded on a non-transitory computer-readable recording medium. The computer-readable recording medium may include program commands, data files, data structures, and the like separately or in combinations. The program commands to be recorded on the non-transitory computer-readable recording medium may be specially designed and configured for embodiments of the present invention or may be well-known to and be usable by one of ordinary skill in the art of computer software. Examples of the non-transitory computer-readable recording medium include a magnetic medium such as a hard disk, a floppy disk, or a magnetic tape, an optical medium such as a compact disk-read-only memory (CD-ROM) or a digital versatile disk (DVD), a magneto-optical medium such as a floptical disk, and a hardware device specially configured to store and execute program commands such as a ROM, a random-access memory (RAM), or a flash memory. Examples of the program commands are advanced language codes that can be executed by a computer by using an interpreter or the like as well as machine language codes made by a compiler.

Although exemplary embodiments have been disclosed for illustrative purposes, one of ordinary skill in the art will appreciate that diverse variations and modifications are possible, without departing from the spirit and scope of the present disclosure. Thus, the above exemplary embodiments should be understood not to be restrictive but to be illustrative, in all aspects. For example, respective elements described in an integrated form may be dividedly used, and the divided elements may be used in a state of being combined.

While one or more example embodiments have been described with reference to the figures, it will be understood by those of ordinary skill in the art that various changes in form and details may be made therein without departing from the spirit and scope as defined by the following claims.

What is claimed is:

1. An image display apparatus comprising:
a display;
a processor configured to:
receive a channel selection signal in which a single channel is selected;
identify that a plurality of services are to be provided through the selected single channel by parsing information about the selected single channel, and;
generate a plurality of data obtainers to obtain the plurality of services corresponding to the plurality of services,
when a number of the generated data obtainers is identical to a number of the plurality of services to be provided through the selected single channel, control the plurality of data obtainers to obtain the plurality of service streams respectively corresponding to the plurality of services provided through the selected single channel; and
when the number of the generated data obtainers is smaller than the number of the plurality of services to be provided through the selected single channel, control the plurality of data obtainers to obtain service streams corresponding to services having relation with a service selected by a user; and
a decoder configured to decode one service stream, corresponding to the service selected by the user, from among the service streams obtained by the data obtainers, wherein, in response to receiving a user input for switching between services, the decoder is further configured to decode a new service stream corresponding to a switched-to service from among the obtained plurality of service streams, and wherein the plurality of services comprises a first service of providing broadcasting content, a second service of providing program information, and a third service of providing an audio service.

2. The image display apparatus of claim 1, wherein the processor is further configured to: transmit network information associated with each of the plurality of services to each of the plurality of data obtainers.

3. The image display apparatus of claim 2, wherein each of the plurality of data obtainers is configured to: search for packet identifiers (IDs) of audio data and video data of a corresponding service from among the plurality of services, based on the network information, and obtain the audio data and the video data based on the packet IDs found in the search.

4. The image display apparatus of claim 1, wherein the information about the selected channel is service list table (SLT) information comprising identification of each of the plurality of services, and a respective category.

5. The image display apparatus of claim 1, wherein data of the plurality of services is broadcasting data that is provided according to an Advanced Television Systems Committee (ATSC) 3.0 standard.

6. The image display apparatus of claim 1, wherein the processor is further configured to:
when the number of the generated data obtainers is smaller than the number of the plurality of services to be provided through the selected single channel, control the plurality of data obtainers to obtain the service streams corresponding to services adjacent to the service selected by the user.

7. An image displaying method comprising:
receiving a channel selection signal in which a single channel is selected;
identifying, by a processor, that a plurality of services are to be provided through the selected single channel, by parsing information about the selected single channel;
generating a plurality of data obtainers to obtain the plurality of services corresponding to the plurality of services,
when a number of the generated data obtainers is identical to a number of the plurality of services to be provided through the selected single channel, controlling the plurality of data obtainers to obtain the plurality of service streams respectively corresponding to the plurality of services provided through the selected single channel;
when the number of the generated data obtainers is smaller than the number of the plurality of services to be provided through the selected single channel, controlling the plurality of data obtainers to obtain service streams corresponding to services having relation with a service selected by a user;
decoding one service stream, corresponding to the service selected by the user, from among the service streams obtained by the plurality of data obtainers; and
outputting the decoded service stream, wherein the decoding comprises, in response to receiving a user input for switching between services, decoding a new service stream corresponding to a switched-to service from among the obtained plurality of service streams, and wherein the plurality of services comprises a first service of providing broadcasting content, a second service of providing program information, and a third service of providing an audio service.

8. The image displaying method of claim 7, wherein the obtaining of the plurality of service streams further comprises:
transmitting network information associated with each of the plurality of services to each of the plurality of data obtainers.

9. The image displaying method of claim 8, wherein the obtaining of the plurality of service streams further comprises:

searching for packet identifiers (IDs) of audio data and video data of a service corresponding to each of the plurality of data obtainers, based on the network information; and obtaining the audio data and the video data based on the packet IDs found during the searching.

10. The image displaying method of claim 7, wherein the information about the selected channel is service list table (SLT) information.

11. The image displaying method of claim 7, wherein data of the plurality of services is broadcasting data that is provided according to an Advanced Television Systems Committee (ATSC) 3.0 standard.

12. The image displaying method of claim 7, wherein the plurality of services comprise providing high definition content and standard definition content through the selected single channel.

13. The image displaying method of claim 7, wherein the plurality of services comprise a multi-mode service (MMS) and the method further comprises generating a service list table (SLT) based on the obtained plurality of service streams for the selected single channel.

14. The image displaying method of claim 7, wherein each of the plurality of data obtainers receives network information associated with a respective service.

15. The image displaying method of claim 14, wherein the network information comprises UDP port information allocated to each of the plurality of services, and wherein each of the plurality of data obtainers monitors a respective UDP port to obtain a respective service stream comprising audio and video signal.

16. A non-transitory computer-readable recording medium having recorded thereon a program for executing the image displaying method of claim 7.

* * * * *